United States Patent [19]

Sposato

[11] Patent Number: 5,042,163
[45] Date of Patent: Aug. 27, 1991

[54] METHOD FOR PROVIDING DESIRED BALANCE OF BOWLING BALLS

[76] Inventor: Richard L. Sposato, 7448 Coachlight La., Liverpool, N.Y. 13088

[21] Appl. No.: 560,198

[22] Filed: Jul. 31, 1990

[51] Int. Cl.⁵ .................................................. G01B 1/00
[52] U.S. Cl. .................................... 33/509; 273/63 C; 273/54 R; 273/37
[58] Field of Search ............ 33/509, 510, 1 SB, 1 SD, 33/424, 431, 534, 538, 1 SA; 273/63 C, 63 B, 63 R, 54 R, 37, 63 E

[56] References Cited

U.S. PATENT DOCUMENTS

| | | | |
|---|---|---|---|
| 1,155,355 | 10/1915 | Harrigan | 33/424 |
| 1,356,306 | 10/1920 | Neill | 33/424 |
| 1,944,812 | 1/1934 | Sandell | 33/424 |
| 2,578,077 | 12/1951 | McKnight, Jr. | 33/424 |
| 3,835,545 | 9/1974 | Taylor | 33/510 |
| 3,875,668 | 4/1975 | Taylor | 33/509 |
| 4,742,620 | 5/1988 | Manker | 33/510 |
| 4,969,271 | 11/1990 | Sump | 33/1 SD |

Primary Examiner—Allan N. Shoap
Assistant Examiner—William C. Dowling
Attorney, Agent, or Firm—Charles S. McGuire

[57] ABSTRACT

A method of using an article to facilitate determination of the location of the balance hole necessary to change the side, finger/thumb and top/bottom weights of a bowling ball from known starting weights to desired ending weights, or to determine a set of ending weights necessary to place the center of gravity of the ball at a desired location. The article may also be used to determine the amount of weight to be removed by the balance hole in order to provide the desired ending weights. The article includes a base sheet, having a set of X-Y coordinates and an arcuate scale printed on one surface, and a linear reference line movable with respect to the base sheet about an axis through the intersection of the X-Y coordinates. Indicia scales adjacent the X and Y coordinates are marked in uniform increments. The arcuate scale intersects the X and Y coordinates at points appreciably spaced from the intersection thereof and having a radius centered at the intersection. The arcuate scale is marked in equal increments, from 0 at the Y coordinate to the value equal to one-quarter of the ball circumference (e.g., 6¾") at the X coordinate. The reference line is preferably printed on a transparent sheet pivotally attached to the base sheet, and an additional indicia scale, in uniform increments equal to those of the X and Y coordinate indicia scale, is preferably printed along the reference line.

9 Claims, 2 Drawing Sheets

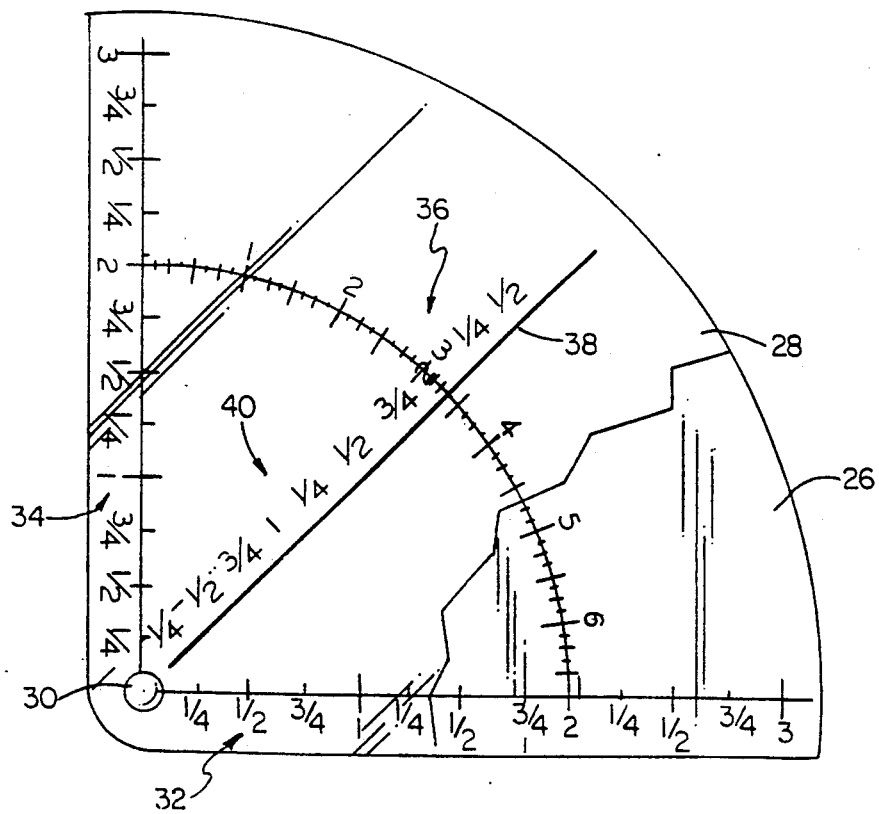

United States Patent Office

PTO - BOYERS, PA Duty Station

MISSING PAGE TEMPORARY NOTICE

PATENT # 5042163   FOR ISSUE DATE 8-27-91

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

DRAWING SHEET # 1 & 2

Data Conversion Operation
Boyers, Pa

METHOD FOR PROVIDING DESIRED BALANCE OF BOWLING BALLS

BACKGROUND OF THE INVENTION

The present invention relates to a method, and an article useful in the practice of such method, for altering the balance of a bowling ball to conform to a desired set of specifications. More specifically, the invention relates to an improved and simplified method of determining the location and size of a hole to be drilled in a bowling ball having predrilled grip holes and known balance characteristics in order to optimize such balance characteristics for a particular bowler.

Bowling balls are normally composed of a machineable, thermosetting plastic, comprising an inner core and a shell with a smooth, spherical surface. Although the plastic materials forming the core and shell are essentially homogeneous, a weight block having a density greater than that of the ball material is normally incorporated in the core, thereby placing the center of gravity at some point other than the center of the ball. Furthermore, removal of material by drilling the grip holes, i.e., two finger holes and a thumb hole, shifts the center of gravity to a location different from that of the undrilled ball, as well as changing the balance characteristics between pairs of adjacent ball hemispheres.

The action of a bowling ball as it travels down the lane is dependent upon the bowler's release, as well as the location of the weight block, and the location and amount of weight at the center of gravity. When a bowling ball is released in the usual manner, it tends to slide along the alley in its initial travel, then changing at some point, depending upon the previously noted factors, from a slide to a roll. The path of the ball is not usually the same during the slide and roll portions of the ball's travel. The change of direction in the transition from slide to roll is known as the "break" or "snap." The point in the ball's travel where the break begins, as well as the relative abruptness (i.e., whether a relatively gradual or a sharp break), also depend largely on the factors noted above. Of course, the coefficient of friction between the ball and lane also has a significant effect; thus, it is not uncommon for a bowler to have more than one ball, each having characteristics suited to the bowler's preference for the particular lane.

In order to achieve maximum striking power, it is necessary that the bowler use a consistent delivery or release, and that the ball have balance characteristics and a center of gravity located to provide an optimum break point for that particular release. By "balance characteristics" is meant the relative balance or imbalance of two adjacent hemispheres of the ball taken on each of three, mutually perpendicular, imaginary planes. These planes are in a specified relation to the position of the grip holes, as is well known to ball drillers and other advanced bowlers, and as explained in greater detail hereinafter.

Once a bowler has acquired sufficient experience and technique to develop a reasonably consistent release, the balance characteristics and center of gravity location of the ball must be established to optimize ball action, and thus score, for that particular release on a lane of known characteristics. The bowler's release, basically a combination of velocity, lift and spin imparted by the bowler, as well as the position of the weight block, will result in a specific "track," i.e., the circular area on the ball surface which contacts the lane during ball travel. The track concentrically surrounds the axis of rotation which, in virtually all cases, is disposed at an oblique angle with respect to the horizontal lane surface. The farther the weight block is removed from the track, the longer the ball will slide and the sharper it will break. Conversely, the closer the weight block is to the track, the earlier in its travel the ball will begin to roll and the more gradual the break.

The grip holes are drilled in the ball at a position relative to the weight block and the bowler's normal track to provide the general characteristics of slide, roll and break desired for the particular bowler's delivery or release. In order to optimize balance characteristics, it is then necessary to drill an additional hole, removing sufficient material from the ball to produce the previously mentioned relative imbalances between the three sets of ball hemispheres. The present invention is concerned with methods and means of determining the position on the surface of the ball for drilling the balancing hole and the amount of material to be removed to provide optimum ball action for the particular bowler using the ball.

For many years it has been the practice to weigh a bowling ball drilled with finger and thumb holes in each of three specified orientations on a device known as a dodo scale to determine the relative imbalance between three pairs of hemispheres. The location of, and amount of weight to be removed by, the balancing hole in order to change the known, i.e., the measured or "starting" weights, to the desired ending weights is then calculated. This operation has traditionally been performed by manual calculation involving comparison of each set of starting and ending weights with one another, and with the weights of other sets, and marking off calculated distances in specified directions from a reference point.

The calculations require considerable expertise and know-how in ball geometry and balance characteristics on the part of the ball driller. In order to simplify the process, and to render it more accurate, the mathematics of locating and sizing a balance hole, as well as other parameters of ball weight and drilling calculations, have been reduced to formulae and programmed into a pocket computer, as disclosed in U.S. Pat. No. 4,742,620, issued May 10, 1988 to R. C. Manker. Performance of the calculations in this manner, while considerably faster and possibly more accurate than the usual, manual method, requires access to and familiarity with operation of relatively expensive and technically sophisticated computer equipment.

It is an object of the present invention to provide an article of manufacture useful in implementing a novel and improved method of determining the location of a balance hole in a bowling ball having pre-drilled finger and thumb holes to optimize balance characteristics for a particular bowler.

An additional object is to provide an article of manufacture useful in implementing a novel and improved method of determining the amount of weight to be removed by a balance hole in a bowling ball in order to provide desired balance characteristics.

Another object is to provide an article of manufacture useful in implementing a method of determining side finger and top weights in a previously drilled bowling ball necessary to place the center of gravity in a desired location, which method may be performed easily and quickly, without the requirement of relatively expensive equipment such as computer hardware and custom software.

A further object is to provide a relatively inexpensive and simple article of manufacture which may be used with minimal training and experience to aid in determining values concerning the balance characteristics of bowling balls. Other objects will in part be obvious and will in part appear hereinafter.

SUMMARY OF THE INVENTION

In a first aspect the invention is practiced in connection with a bowling ball which has been pre-drilled with two finger holes and a thumb hole, having known (starting) side, finger, and top weights. The difference between each set of weights is determined, including an indication of whether each of the ending (desired) weights is more or less than the starting (known) weight. The value of the difference in side weight is compared to the difference in finger weight to determine a first distance value. The difference in side weight is compared to the difference in top weight to determine a second distance value, each comparison being made and the distance values determined with the aid of the article of manufacture of the invention.

A first reference point is established on the surface of the ball at a position $6\frac{3}{4}''$ ($\frac{1}{4}$ of the circumference of a standard bowling ball) from a point midway between the finger and thumb (grip) holes, i.e., the "center-of-grip" point, the along a first arc perpendicular to a line between the grip hole centerlines, in a direction depending upon whether the ball is to be used by a right-handed or a left-handed bowler and whether side weight is to be added or subtracted from the starting side weight to arrive at the desired side weight. The first distance is measured on the surface of the ball from the first reference point, along a second arc perpendicular to the first arc, in a direction depending upon whether finger weight is to be added or subtracted in order to arrive at the desired finger weight, to establish a second reference point. The second distance is measured on the surface of the ball from the second reference point along a third arc perpendicular to the second arc, in a direction depending on whether top weight is to be added or subtracted in order to arrive at the desired top weight. The point established by the second distance measurement defines the position for drilling the balance hole.

The amount of material to be removed in order to provide the desired weights is determined by first comparing the difference in starting and ending side weights with the difference in starting and ending finger weights. A first value is obtained from a predetermined relationship between the side and finger weight differences. The difference in starting and ending side weights is then compared to the difference in starting and ending top weights, and a second value is obtained from a predetermined relationship therebetween. The first and second values are then compared according to a predetermined relationship to arrive at a figure indicating the amount of weight to be removed by the balance hole.

The invention provides a relatively simple and inexpensive article of manufacture for making the aforementioned comparisons of the weight values in order to arrive at the first and second distance values, as well as the values indicating the weight to be removed. The article includes a base sheet bearing a set of X-Y coordinates with associated numerical scales, and a transparent cover sheet pivotally attached to the base sheet at the intersection of the coordinates. The base sheet also includes an arcuate line having a radius centered at the intersection of the X and Y coordinates. The cover sheet has imprinted thereon a linear reference line, also preferably with an associated numerical scale, extending from the point of pivotal attachment of the base and cover sheets and intersecting the arcuate line on the base sheet. The cover sheet is moved relative to the base sheet about the pivotal attachment to align the reference line with coordinate points on the base sheet and obtain values from the scale on the arcuate line.

In another aspect of the invention, the article of manufacture may be used to determine a set of side, finger/thumb and top/bottom weights which will cause the center of gravity of the ball to be located in a desired position. The article may then be used in the manner described above to determine the position of and amount of weight to be removed by a balance hole in order to provide the determined set of weights.

The foregoing and other features of the invention will be more readily understood and appreciated from the following detailed description, taken in conjunction with the accompanying drawings.

BRIEF DESCRIPTION OF THE DRAWINGS

FIG. 1 is a perspective view of a bowling ball surface illustrating the location of a reference point on the ball;

FIGS. 2, 3 and 4 are perspective, exploded perspective and plan views of the preferred embodiment of an article of manufacture which may be used to perform or facilitate certain steps of the method of the invention; and FIG. 5 is a plan view of the article of FIGS. 2-4 positioned to find a first distance value in accordance with an example of the method of the invention;

FIG. 6 is a perspective view of the bowling ball showing the position of a point thereon located by the first distance value;

FIG. 7 is a plan view of the article positioned to find a second distance value in accordance with the aforementioned example;

FIG. 8 is a perspective view of the bowling ball showing the position of the point locating the balance hole, located by the second distance value;

FIG. 9 is a perspective view of the bowling ball illustrating a method of locating the center of gravity of the ball at a desired position; and FIG. 10 is a graphical example of another method of determining ending balance weights in order to locate the ending center of gravity in a desired location.

DETAILED DESCRIPTION

The invention will be best understood with reference to bowling ball 10 shown in FIGS. 1-5 with a series of markings which may be applied to the surface during progression of the series of steps involved in locating the position for drilling the balance hole. As previously mentioned, the method of the invention is performed in conjunction with a ball having pre-drilled grip holes, i.e., finger holes 12 and 14, and thumb hole 16. The position of the grip holes is selected with respect to the position and orientation of the weight block relative to the bowler's track to provide generally the type of ball action desired by the bowler, as previously described. Optimization of the desired ball action is achieved by adjusting the balance characteristics of the drilled ball in accordance with the invention.

As a preliminary step, the ball 10 is weighed in each of three positions on a conventional scale, commonly known in the bowling industry as a dodo scale, to determine the amount of imbalance, if any, between adjacent hemispheres. One pair of hemispheres is that on opposite sides of a plane passing through the midpoint between finger holes 12 and 14, and the center of thumb hole 16, a portion of the intersection of such plane with the surface of ball 10 being represented by line 18. The second pair of hemispheres lie on opposite sides of a plane perpendicularly intersecting line 18 at a point midway between the center of a line connecting the centers of finger holes 12 and 14 and the center of thumb hole 16; a portion of the intersection of the plane separting the second set of hemispheres with the surface of ball 10 is represented by line 20. The third pair of hemispheres is defined by a plane mutually perpendicular to the first two planes, line 22 representing a segment of the intersection of the third plane with the surface of ball 10.

The division of bowling balls into three pairs of hemispheres by imaginary planes in the positions indicated in FIG. 1, and weighing the balls on a dodo scale to determine the amount of imbalance between adjacent hemispheres has been standard practice for many years. The amount of imbalance between the hemispheres on opposite sides of the plane represented by line 18 is commonly termed "side weight" with a + or − sign to indicate whether the greater weight is in the right or left side, respectively, when facing the side of the ball with the grip holes with the finger holes above the thumb hole (for right-handed bowlers). The imbalance between the hemispheres on opposite sides of line 20 is termed "finger weight" or "thumb weight," depending upon which of the hemispheres having the finger holes and the thumb hole is heavier. Likewise, the imbalance between the third pair of hemispheres is termed "top weight" if the heavier hemisphere is that containing the grip holes, and "bottom weight" if the reverse.

Rules of the American Bowling Congress presently provide that regulation balls can have not more than one ounce (+ or −) side weight, one ounce finger or thumb weight, and three ounces top or bottom weight. In addition to these constraints, the ball may be dynamically balanced about its rotational axis. The rotational axis is the ball axis perpendicular to the plane through the "truck," i.e., the area of the ball surface which contacts the alley surface during travel down the alley. The position of the track relative to the grip holes is dependent largely upon the particular bowler's style of delivery or release. Assuming the bowler uses a reasonably consistent release, the track may be located in any of a number of ways, such as noting the position of scuff marks on a ball used for some time exclusively by that bowler. An example of the track area on ball 10 is indicated by reference numeral 24, the axis of rotation about this track being denoted as X—X in FIG. 1.

After the finger and thumb holes have been drilled, and the ball is weighed to determine the side, finger/thumb and top/bottom weights, a balance hole may be drilled in order to provide balance characteristics which will optimize ball action for the release and delivery techniques of the bowler who will be using the ball. The balance hole must have a size (diameter and depth) and location on the ball surface such that the side (+ or −), finger or thumb and top or bottom weights conform to the desired balance characteristics. The American Bowling Congress also limits the maximum diameter of the balance hole to $1\frac{1}{4}''$ under the present rules. Bowlers with sufficient experience in the game may know the balance characteristics which they desire; that is, an experienced bowler may know the values of side (+ or −), finger or thumb, and top or bottom weight which produce the ball action best suited to his or her style of delivery and release. The method and article of the invention may then be employed to expedite calculation of the location and size of the balance hole necessary to provide the desired balance characteristics.

In other cases the bowler may know, or it may be determined by a bowling professional or experienced ball driller, where the center-of-gravity of the ball should be placed to best suit the bowler's needs. In the latter case, the method and article of manufacture of the present invention may be advantageously used to determine the imbalance weights necessary to place the center-of-gravity at the desired location. An example of each embodiment of the invention, i.e., locating the balance hole based on known balance characteristics or on a known, optimum position of the center of gravity, will now be described.

As a preliminary step in the practice of both embodiments the difference between each set of weights is calculated. For example, if the ball has a starting side weight of $+1\frac{1}{4}$ oz. and a desired ending side weight of $+\frac{3}{4}$ oz., the difference is $-\frac{1}{2}$ oz., the minus sign indicating that positive side weight is to be removed when adjusting from starting to ending side weight. Likewise, the ball may have a starting finger weight of 1 oz. and a desired ending finger weight of $\frac{3}{8}$ oz., for a difference of $-\frac{5}{8}$ oz., indicating that $\frac{5}{8}$ oz. of finger weight is to be removed. Also, assuming the ball has a starting top/bottom weight of zero, i.e., the top and bottom hemispheres are evenly balanced, and an ending top weight of 3/16 oz., the difference is +3/16 oz., indicating that 3/16 oz. of top weight is to be added. Thus, in this example, the starting and ending weights, and the difference between the two, may be tabulated as follows:

TABLE I

|  | Start | End | Diff. |
| --- | --- | --- | --- |
| side | $+1\frac{1}{4}$ | $+\frac{3}{4}$ | $-\frac{1}{2}$ |
| finger | 1 | $\frac{3}{8}$ | $-\frac{5}{8}$ |
| top | 0 | 3/16 | −3/16 |

For many years it has been the normal practise of ball drillers to calculate the differences in the three weights, i.e., the amount of change in each weight necessary to provide a ball having the desired ending weights, and then calculate the size and position of the balance hole which would produce the changes from starting to ending weights. Various ball drillers have used different methods, most involving a considerable degree of estimation, in sizing and locating the balance hole. In any case, a certain amount of mathematical calculation was required, combined with a comprehensive knowledge of bowling ball geometry and dynamics, in order to start from a reference point on the ball and locate the balance hole with respect thereto. The reference point most commonly used was the center-of-grip (point A in FIG. 1) and coordinates for locating the balance hole were calculated from that point.

The mathematical calculations necessary to locate the balance hole are greatly simplified in the present invention by the use of an article of manufacture comprising a set of coordinates printed on a base member and a transparent sheet pivotally attached to the base member for movement with respect thereto of a cooperative reference line. The method of the invention involves a sequence of steps involving location of coordinates on the base member and, with the aid of the movable reference line, the determination of corresponding distance values on an arc printed on the base member. Another sequence of steps may be performed with the assistance of indicia on the movable reference line to determine the amount of weight to be removed by the balance hole.

Before describing the various steps involved in performing the method(s) of the invention, the preferred embodiment of the article of manufacture will be described, with reference to FIGS. 2-4, wherein the article is shown in top perspective, exploded perspective and plan views, respectively. The article comprises base member 26, preferably an opaque sheet of rigid or semiflexible paperboard, plastic, or other suitable material, and cover sheet 28 of transparent material pivotally attached to base 26 by two-piece rivet 30. Printed on the upper surface of base 26 is a set of X-Y coordinates, generally indicated in FIG. 4 by reference numerals 32 and 34, respectively, and arcuate scale 36.

The X-Y coordinates are of equal scale and marked in equal increments, although not necessarily corresponding to actual measurements in inches or other units. The arc of scale 36 has a radius centered at the intersection of the X-Y coordinates, at which point the pivotal connection of base 26 and cover 28 is located. Scale 36 is marked in equal increments from 0 at the Y coordinate to $6\frac{3}{4}$ at the X coordinate. The $6\frac{3}{4}$ increments of the arcuate scale correspond to the number of inches in one-quarter of the actual circumference of a standard 27 inch circumference bowling ball. Although the increments of scales 32 and 34 must be equal to one another, they need not bear any particular relationship to the increments of scale 36, which may intersect the X and Y scales at any desired location consistent with easy reading of the scales.

The edges of base 26 adjacent X-Y coordinates 32 and 34 are straight and the edge outwardly adjacent scale 36 is arcuately concentric therewith, cover 28 being of the same size and configuration, although it will be understood that the peripheral configuration of the base and cover have no effect on operation of the invention. It is preferred, for ease of finding the intersection of points on the X and Y coordinates, that base member 26 be printed with a grid, as indicated in FIG. 4. The grid, as well as the numerical scales 32, 34 and 36, are visible through transparent cover sheet 28, which bears reference line 38, extending linearly from the point of pivotal attachment of the base and cover at the intersection of the X-Y coordinates. Scale 40 is provided adjacent reference line 38 for use in practicing one aspect of the invention, as explained later. The increments of scale 40 are equal to those of scales 32 and 34, beginning at 0 at the intersection of the X and Y coordinates.

Turning now to the steps involved in practicing the invention to locate the balance hole after the differences between the beginning and ending side ($\pm$), finger/thumb, and top/bottom weights have been determined as previously explained, the values of the differences in finger and side weight are located on the X and Y coordinates, respectively. Continuing with the example of the values given in Table I, $\frac{5}{8}$ is located on scale 32 and $\frac{1}{2}$ on scale 34; the + or − signs indicating whether the weight is to be increased or decreased from starting to ending weight are not taken into account at this point in the procedure. Cover sheet 28 is moved as necessary to make reference line 38 cross the intersection of X coordinate $\frac{5}{8}$ and Y coordinate $\frac{1}{2}$, i.e., in the position shown in FIG. 5, where it will be noted that reference line 38 crosses arcuate scale 36 at indicia mark $3\frac{5}{8}$. This is the distance in inches from reference point B, measured along line 22, in the upward direction if finger weight is to be removed (as in the present example) and in the downward direction if finger weight is to be added, for establishing a second reference point. The terms "upward" and "downward" are meant to apply to the ball in the orientation shown in FIG. 6, i.e., with finger holes 12 and 14 above thumb hole 16, where the position of reference point C is indicated.

As the next step, the value of the differences in top weight and side weight are located on the X and Y coordinates, respectively, and cover sheet 28 is moved to cause reference line 38 to cross the intersection of these coordinates on base 26. Following the example of Table I, $\frac{1}{2}$ is located on scale 34 and 3/16 on scale 32, again without considering the sign of the weight difference value, and cover 28 is positioned so that line 38 crosses the intersection of these coordinates, as shown in FIG. 7. In this position, line 38 crosses arcuate scale 36 at indicia mark $1\frac{1}{2}$. This distance ($1\frac{1}{2}$ inches) is then measured from point C, perpendicularly to line 22, in a direction away from the grip holes if top weight is to be added (as in the present example), or toward the grip holes if top weight is to be reduced (subtracted). The point so located is marked on ball 10, as indicated at point D in FIG. 8, and the balance hole is drilled at this point.

The amount of weight to be removed to provide the desired ending weights may be quickly and easily determined with the assistance of the article of manufacture. Cover sheet 28 is moved to make reference line 38 cross the intersection of the X-Y coordinates corresponding to the differences in finger weight and side weight, respectively. This is the same step previously performed to determine the distance from reference point B to be measured along line 22, i.e., reference line 38 is positioned as shown in FIG. 5. The indicia reading on scale 40, adjacent reference line 38, at the intersection of the X-Y coordinates corresponding to the differences in finger and side weights provides a first value, which may be noted when cover sheet 28 is originally positioned to determine the distance value from point B to point C.

As the next step in determining the amount of weight to be removed, cover sheet 28 is positioned to cause reference line 38 to cross the intersection of the X and Y coordinates corresponding to the differences in the starting and ending top weights and side weights, respectively, i.e., the cover sheet is positioned as in FIG. 7. The indicia reading on scale 40 at the intersection of the X and Y coordinates at this point provides a second value; again, this value may be noted when performing the step to determine the distance from point C to point D, as previously described. As the final step, cover sheet 28 is positioned to cause reference line 38 to cross the intersection of the X and Y coordinates corresponding to the first and second values obtained from scale 40. The indicia reading on scale 40 adjacent this intersection indicates the number of ounces to be removed in drilling the balance hole. The proper combination of drill bit size (hole diameter) and depth of the hole to remove the required amount of material may be obtained from standard charts.

In the preceding example, it was assumed that the bowler knew from prior experience the ending weights necessary to provide the desired ball action. However, instead of knowing the desired ending weights, the bowler may know the optimum location for the center of gravity relative to the bowler's track. That is, since ball action for a particular release depends on the location of the center of gravity and its relation to the bowler's track, the desired type of ball action can be achieved by proper placement of the center of gravity as determined by the location of a balance hole and the amount of weight to be removed. The previousy described method proceeds from three sets of known starting and ending weights, and the difference between the two weights of each set; the location of a balance hole and the amount of weight to be removed necessary to provide the desired ending weights is determined without specific reference to where the center of gravity will be located after the balance hole is drilled. When the desired position of the center of gravity is known, the steps described in the following paragraphs may be performed in order to determine the required ending weights.

The desired position of the center of gravity (actually, the point on the surface of the ball closest to the center of gravity) is marked on the surface of the ball, for example, the point indicated at E in FIG. 9. Points A and B are located and arc 22 is marked on the ball surface, perpendicular to arc 20, as in the previous example, point B being located on the side of point A nearest point E. Arc 42 is drawn on the surface of the ball extending through points A and E, intersecting line 22 at point F. The distance along line 22 between points B and F is measured, and reference line 38 is positioned to intersect arcuate scale 36 at the indicia marking corresponding to the distance measured, in inches. A set of values for ending finger weight and corresponding ending side weight is provided by indicia scales 32 and 34, respectively, at all points of intersection of the X-Y coordinates with reference line 38. Such values may be chosen at any intersection point, keeping in mind the maximum allowable side and finger weights.

After the ending side weight is selected from scale 34 and the corresponding ending finger weight (or thumb weight, if point E is below line 20) is noted from scale 32, the distance on the surface of the ball from point E to point F is measured. Reference line 38 is then located in a second position, intersecting arcuate scale 36 at the indicia mark corresponding to this distance (in inches). The point of intersection with reference line 38 of the value previously chosen from scale 34 to represent ending side weight is located; the ending top/bottom weight is the value on indicia scale 32 at this point of intersection. After thus determining the ending side, finger/thumb and top/bottom weights necessary to place the ending center of gravity in the desired location, the differences between these ending weights and the starting weights determined by weighing the ball on a dodo scale are calculated and the location and the amount of weight to be removed are determined according to the steps previously described. The article of manufacture may be advantagously used to calculate the approximate ending side, finger/thumb and top/bottom weights which will place the center of gravity at a desired location relative to the grip position whether or not the grip holes have been pre-drilled. This method may be performed strictly as a "paper" calculation without specific reference to the ball surface by way of marking points, axes, or the like, thereon, and will be best understood with reference to FIG. 10.

A center-of-grip point A' is established by perpendicular lines in the usual manner, and a first reference point B' is placed at a distance ¼ of the ball circumference from the center-of-grip point, along line or vector 2D' as in previous examples. Point E' corresponding to the point on the surface of the ball which is closest to the ending center of gravity is then placed in the desired position relative to the center-of-grip. Many bowlers, for example, prefer the "center-of-gravity point to be substantially coincident with the axis of rotation, as determined by their particular track, which is in a known relation to the grip position. A second reference point C' is located on line or vector 22', at the intersection thereof with line 43, line 22' being perpendicular to line 20' and line 43 being perpendicular to line 22' and passing through point E'. A first distance $d_1$ is measured from point B' to point C', and a second distance $d_2$ is measured from point C' to point E'. Reference line 38 is positioned to intersect arcuate scale 36 at the indicia marking thereon corresponding to the first distance $d_1$. A set of corresponding finger/thumb and side weights is then selected from the X and Y coordinate scales, respectively, at any point intersected by reference line 38, keeping in mind the maximum allowable imbalance weights.

The reference line is then positioned to intersect arcuate scale 36 at the indicia mark corresponding to the second distance $d_2$. The ending top/bottom weight is the value on the X coordinate indicia scale which intersects reference line 38 at the position intersected by the side weight value selected in the preceding step on the Y coordinate indicia scale.

Once a set of ending side, finger/thumb and top/bottom weights have been determined in this manner, the position of and amount of weight to be removed by the balance hole may be determined, for a pre-drilled ball having known beginning weights, by the previously described methods. It should be noted that the last-described method is not as accurate as that described in connection with FIG. 9 linear relationships are used, rather than the actual, spherical relationship of the ball surface. However, the approximations will be adequate for most purposes.

What is claimed is:

1. A method of determining the location for drilling a balance hole in a bowling ball of known circumference having pre-drilled finger and thumb holes defining a center-of-grip point, and predetermined differences between starting and ending side weights, finger/thumb weights and top/bottom weights, said method comprising:
   a) printing on a base sheet a set of X-Y coordinates having respective indicia scales marked out in uniform increments, each beginning at "0" at the intersection of said coordinates, and an arcuate scale spaced from said intersection by an appreciable distance extending between said coordinates and having a radius centered at said intersection, said arcuate scale having uniform increments extending from "0" at said Y coordinate to a value equal to one-quarter of said circumference, in known measuring increments, at said X coordinate;
   b) connecting to said sheet for pivotal movement with respect thereto about an axis through said intersection means defining a reference line extending substantially from said intersection to said arcuate scale;

c) establishing a first reference point on the ball surface spaced from said center-of-grip point by ¼ of the ball circumference on a first arc perpendicular to a line extending from the center of said thumb hole to a point midway between the centers of said finger holes;

d) positioning said reference line in a first position to cross the intersection of values on said X and Y coordinate indicia scales corresponding to said predetermined differences in finger/thumb and side weights, respectively;

e) measuring on said bowling ball surface along a second arc in a direction perpendicular to said first arc a distance equal to the value on said arcuate scale intersected by said reference line when in said first position to establish a second reference point;

f) positioning said reference line in a second position cross the intersection of values on said X and Y coordinate indicia scales corresponding to said predetermined differences in top/bottom and side weights, respectively; and g) measuring on said bowling ball surface along a third arc in a direction perpendicular to said second arc a distance equal to the value on said arcuate scale intersected by said reference line when in said second position to establish the position of said balance hole.

2. The method of claim 1 wherein said first reference point is established to the right of said center-of-grip point, with the ball oriented with the finger holes above the thumb hole, when the ball is to be used by a right-handed bowler and side weight is to be removed, or when the ball is to be used by a left-handed bowler and side weight is to be added, and to the left of said center-of-grip point in other cases.

3. The method of claim 2 wherein said second reference point is established above said first reference point when finger weight is to be removed, and below said first reference point when finger weight is to be added.

4. The method of claim 3 wherein said balance hole position is established by moving from said second reference point in a direction away from said grip holes when top weight is to be added, or toward said grip holes when top weight is to be removed.

5. A method determining the amount of weight to be removed from a bowling ball of known circumference by a balance hole drilled therein, said method comprising:

a) printing on a base sheet a set of X-Y coordinates having respective indicia scales marked out in uniform increments, each beginning at "0" at the intersection of said coordinates, and an arcuate scale spaced from said intersection by an appreciable distance extending between said coordinates and having a radius centered at said intersection, said arcuate scale having uniform increments extending from "0" at said Y coordinate to a value equal to one-quarter of said circumference, in known measuring increments, at said X coordinate;

b) connecting to said sheet for pivotal movement with respect thereto about an axis through said intersection means defining a reference line extending substantially from said intersection to said arcuate scale;

c) printing an additional indicia scale marked out in uniform increments equal to said X-Y indicia scale increments on or adjacent to, and movable with, said reference line;

d) positioning said reference line in a first position to cross the intersection of values on said X and Y coordinate indicia scales corresponding to said predetermined differences in finger/thumb and side weights, respectively;

e) noting a first value on said additional indicia scale adjacent said X and Y coordinate intersection with said reference line in said first position;

f) positioning said reference line in a second position to cross the intersection of values on said X and Y coordinate indicia scales corresponding to said predetermined differences in top/bottom and side weights, respectively;

g) noting a second value on said additional indicia scale adjacent said X and Y coordinate intersection with said reference line in said second position; and h) positioning said reference line in a third position relative to said base sheet to cause said reference line to cross the intersection of said first value on one and said second value on the other of said X and Y coordinate indicia scales, the third value on said additional indicia scale adjacent said X and Y coordinate intersection with said reference line in said third position being substantially equal to the weight in ounces to be removed by said balance hole.

6. A method of determining ending side, finger/thumb and top/bottom weights of a bowling ball of known circumference having pre-drilled finger and thumb holes defining a center-of-grip point which will position the center of gravity of the ball at a desired location, said method comprising:

a) printing on a base sheet a set of X-Y coordinates having respective indicia scales marked out in uniform increments, each beginning at "0" at the intersection of said coordinates, and an arcuate scale spaced from said intersection by an appreciable distance extending between said coordinates and having a radius centered at said intersection, said arcuate scale having uniform increments extending from "0" at said Y coordinate to a value equal to one-quarter of said circumference, in known measuring increments, at said X coordinate;

b) connecting to said sheet for pivotal movement with respect thereto about an axis through said intersection means defining a reference line extending substantially from said intersection to said arcuate scale;

c) marking the point closest to said desired location on the surface of the ball;

d) establishing a first reference point on the ball surface spaced from said center-of-grip point by ¼ of the ball circumference on a first arc perpendicular to a line extending from the center of said thumb hole to a point midway between the centers of said finger holes;

e) marking a second arc on the ball surface perpendicular to said first arc;

f) marking a third arc on the ball surface intersecting said center-of-grip point, said point closest to said desired location, and said second arc;

g) measuring a first distance along said second arc from said first reference point to the intersection of said second and third arcs;

h) positioning said reference line in a first position intersecting said arcuate scale at a point thereon corresponding to the value in inches of said first distance;

i) selecting corresponding values in ounces of ending finger/thumb weight and ending side weight from said X and Y coordinate indicia scales, respectively, at any point within allowable weight limits intersected by said reference line when in said first position;

j) measuring a second distance along said third arc from said point closest to said desired location to the intersection of said second and third arcs;

k) positioning said reference line in a second position intersecting said arcuate scale at a point thereon corresponding to the value in inches of said second distance;

l) locating the point of intersection with said reference line, in said second position thereof, of said selected side weight value on said Y coordinate indicia scale; and m) locating the ending top/bottom weight in ounces corresponding to the value on said X coordinate indicia scale at said point of intersection of said selected side weight value with said reference line in said second position thereof.

7. The method of claim 6 and further comprising determining the starting side, finger/thumb and top/bottom weights of said bowling ball, calculating the difference between said starting and said ending side, finger/thumb, and top/bottom weights, and locating the position of a balance hole on the ball surface according to the method of claim 7.

8. The method of claim 7 wherein said ball has a circumference of substantially 27 inches and said arcuate scale has a value of $6\frac{3}{4}$ at its intersection with said X coordinate.

9. A method of determining the ending side, finger/thumb and top/bottom weights of a bowling ball of known circumference which will place the center of gravity of the ball in a desired location relative to the position of a ball grip consisting of two finger holes and a thumb hole, said method comprising:

a) printing on a base sheet a set of X-Y coordinates having respective indicia scales marked out in uniform increments, each beginning at "0" at the intersection of said coordinates, and an arcuate scale spaced from said intersection by an appreciable distance extending between said coordinates and having a radius centered at said intersection, said arcuate scale having uniform increments extending from "0" at said Y coordinate to a value equal to one-quarter of said circumference, in known measuring increments, at said X coordinate;

b) connecting to said sheet for pivotal movement with respect thereto about an axis through said intersection means defining a reference line extending substantially from said intersection to said arcuate scale;

c) establishing the point closest to the desired location of said center of gravity relative to said grip;

d) establishing a first reference point spaced from the center of said grip by $\frac{1}{4}$ of the ball circumference on a first vector perpendicular to a line extending from the center of said thumb hole to a point midway between said finger holes;

e) measuring a first distance from said first reference point to a second reference point located on a second vector, perpendicular to said first vector and spaced from said first reference point by the shortest distance between said point closest to said desired location and said first vector;

f) positioning said reference line in a first position intersecting said arcuate scale at a point thereon corresponding to the value in inches of said first distance;

g) selecting corresponding values in ounces of ending finger/thumb and side weights from said X and Y coordinate indicia scales, respectively, at any point within allowable weight limits intersected by said reference line when in said first position;

h) measuring a second distance from said second reference line to said desired location on a vector perpendicular to said second vector;

i) positioning said reference line in a second position intersecting said arcuate scale at a point thereon corresponding to the value in inches of said second distance;

j) locating the point of intersection with said reference line, in said second position thereof, of said selected side weight value on said Y coordinate indicia scale; and k) locating the ending top/bottom weight in ounces corresponding to the value on said X coordinate indicia scale at said point of intersection of said selected side weight value with said reference line in said second position thereof.

* * * * *